(12) United States Patent
Ji

(10) Patent No.: US 10,225,384 B2
(45) Date of Patent: Mar. 5, 2019

(54) MAGNETIC PAIRING FOR LATERAL RESTORING FORCE

(71) Applicant: Apple Inc., Cupertino, CA (US)

(72) Inventor: Qigen Ji, Fairfield, CA (US)

(73) Assignee: Apple Inc., Cupertino, CA (US)

( * ) Notice: Subject to any disclaimer, the term of this patent is extended or adjusted under 35 U.S.C. 154(b) by 256 days.

(21) Appl. No.: 15/224,285

(22) Filed: Jul. 29, 2016

(65) Prior Publication Data

US 2017/0269634 A1    Sep. 21, 2017

Related U.S. Application Data

(60) Provisional application No. 62/309,414, filed on Mar. 16, 2016.

(51) Int. Cl.
| | |
|---|---|
| *H01F 7/20* | (2006.01) |
| *E05D 1/00* | (2006.01) |
| *H04M 1/02* | (2006.01) |
| *G06F 1/16* | (2006.01) |
| *H01F 7/02* | (2006.01) |
| *E05D 1/06* | (2006.01) |

(52) U.S. Cl.
CPC .......... *H04M 1/0254* (2013.01); *E05D 1/00* (2013.01); *E05D 1/06* (2013.01); *G06F 1/1626* (2013.01); *G06F 1/1681* (2013.01); *H01F 7/0263* (2013.01); *G06F 2200/1634* (2013.01); *H04M 1/0214* (2013.01)

(58) Field of Classification Search
CPC ........ H01F 7/0252–7/0268; E05D 1/00; E05D 1/06
See application file for complete search history.

(56) References Cited

U.S. PATENT DOCUMENTS 7,934,291 B2 * 5/2011 Prest ..................... G06F 1/1616
16/320

* cited by examiner

*Primary Examiner* — Ramon M Barrera
(74) *Attorney, Agent, or Firm* — Dickinson Wright RLLP

(57) ABSTRACT

An electronic device and accessory device are disclosed. The devices may be designed to magnetically couple together. Accordingly, each device may include one or more magnets that magnetically couple. In order to maintain the magnetic coupling and resist some at least some force or forces acting on, for example, the accessory device, the magnets may include a shape designed to increase the amount of force required to move the magnets in the accessory device relative to the magnets in the electronic device. The shape of the magnets may include polygonal shapes such as a trapezoid or a triangle. Magnets, having a trapezoidal or a triangular shape, magnetically couple with one another, may provide a stronger counterforce to lateral forces acting on the magnets.

20 Claims, 10 Drawing Sheets

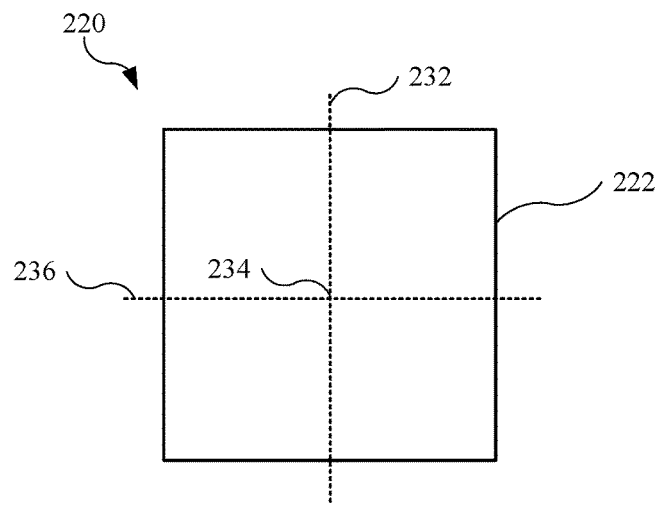
FIG. 3
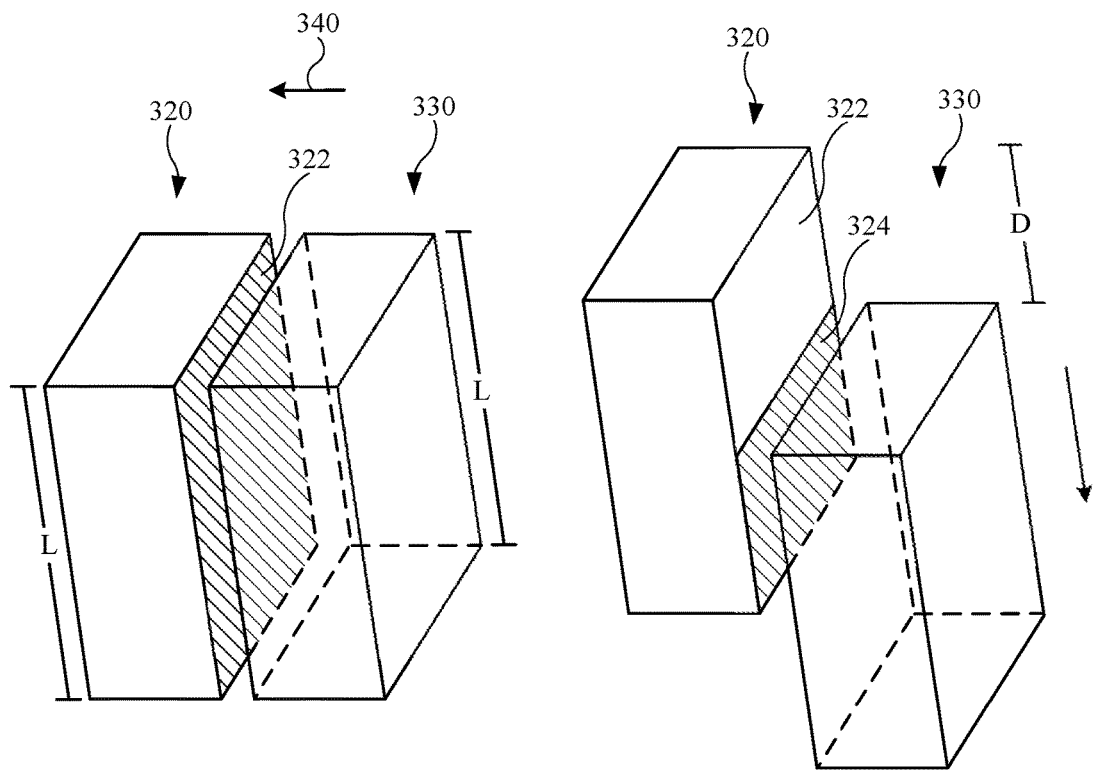
FIG. 4
FIG. 5

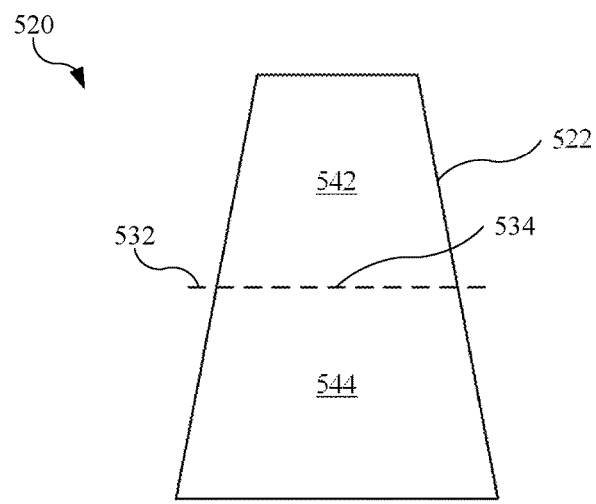
*FIG. 7*
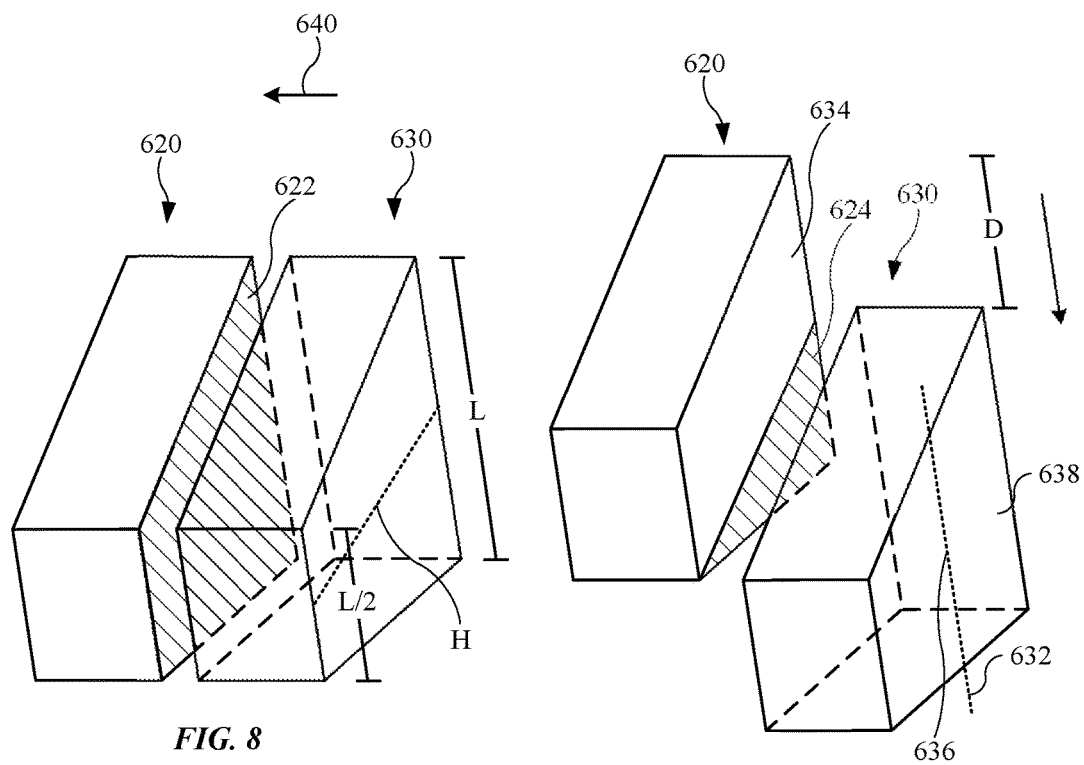
*FIG. 8*  *FIG. 9*

MAGNETIC PAIRING FOR LATERAL RESTORING FORCE

CROSS-REFERENCE TO RELATED APPLICATION

This application claims the benefit of priority to U.S. Provisional Application No. 62/309,414, filed on Mar. 16, 2016, and titled "MAGNETIC PAIRING FOR LATERAL RESTORING FORCE," the disclosure of which is incorporated herein by reference in its entirety.

FIELD

The following description relates to electronic devices and accessory devices. In particular, the following description relates to a magnetic coupling (or magnetic couplings) between electronic devices and accessory devices. The magnet coupling described herein is designed to create a magnetic force that resists lateral forces that may cause lateral movement of at least of one the magnetic elements that form the magnetic coupling. This may prevent an electronic device from decoupling from an accessory device based on the lateral forces.

BACKGROUND

A pair of parts, each having magnets, may couple together using the magnets. The coupling may be caused by a magnetic force that attracts one magnet to the other, with the magnetic force being generally normal, or perpendicular, with the respect to the magnets. However, when magnets are attracted to one another, the normal force may be the only force component acting on the magnets to maintain the coupling. In other words, other forces, such as lateral magnetic attraction forces (perpendicular to the normal force), do not exist between the magnets. As a result, a lateral force, or shearing force, applied to one of the parts may cause the part to move or slide away from the other part, as the lateral force overcomes the normal force, thereby causing the magnetic coupling between the magnets to cease. One solution is to form mechanical features in the parts, with the mechanical features configured to mate with one another. For example, one part may include a slot, or opening, while the other part may include a protruding feature configured to enter the slot. However, this may reduce the overall cosmetics or aesthetics of the parts. Further, the protruding feature exposed and relatively easy to break, while the slot may be susceptible to ingress of contaminants.

SUMMARY

In one aspect, a magnetic attachment assembly is described. The magnetic attachment assembly may include a first magnetic element. The magnetic attachment assembly may further include a second magnetic element. In some embodiments, in an aligned configuration, the first magnetic element and second magnetic element form a magnetic circuit based upon a magnetic surface having an asymmetric shape that provides an asymmetric retaining force in accordance with a relative direction of movement between the first magnetic element and second magnetic element corresponding to an offset configuration that is different from the aligned configuration.

In another aspect, an electronic device configured to releasably couple with an accessory device having an accessory magnet is described. The electronic device may include an enclosure. The electronic device may further include a magnet carried by the enclosure and configured to magnetically couple with the accessory magnet to form a magnetic circuit. In some embodiments, in response to a force that offsets the accessory magnet with respect to the magnet, the magnetic circuit provides an asymmetric counterforce that causes the accessory magnet to align with the magnet.

In another aspect, an accessory device configured to magnetically couple with an electronic device having a device magnet is described. The accessory device may include a body configured to cover the electronic device. The accessory device may further include an attachment feature configured to engage the electronic device. The accessory device may further include a hinge coupled with the body and the attachment feature. The hinge may allow the body to fold over the electronic device. The accessory device may further include a magnet that includes an asymmetric surface area profile and configured to align and magnetically couple with the device magnet to form a magnetic circuit based on the asymmetric surface area profile. In some embodiments, when the device magnet is offset with respect to the magnet, the magnetic circuit provides an asymmetric counterforce that causes the device magnet to align with the magnet.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The disclosure will be readily understood by the following detailed description in conjunction with the accompanying drawings, wherein like reference numerals designate like structural elements, and in which:

FIG. 3 illustrates a plan view of an embodiment of a magnet, in accordance with the described embodiments;

FIG. 4 illustrates an isometric view of a pair of magnets magnetically coupled together;

FIG. 5 illustrates an isometric view of the pair of magnets shown in FIG. 4, further showing the magnets offset with one another;

FIG. 7 illustrates a plan view of an alternate embodiment of a magnet, in accordance with the described embodiments;

FIG. 8 illustrates an isometric view of a pair of magnets magnetically coupled together, in accordance with the described embodiments;

FIG. 9 illustrates an isometric view of the pair of magnets shown in FIG. 8, further showing the magnets offset with one another;

Figure 1:
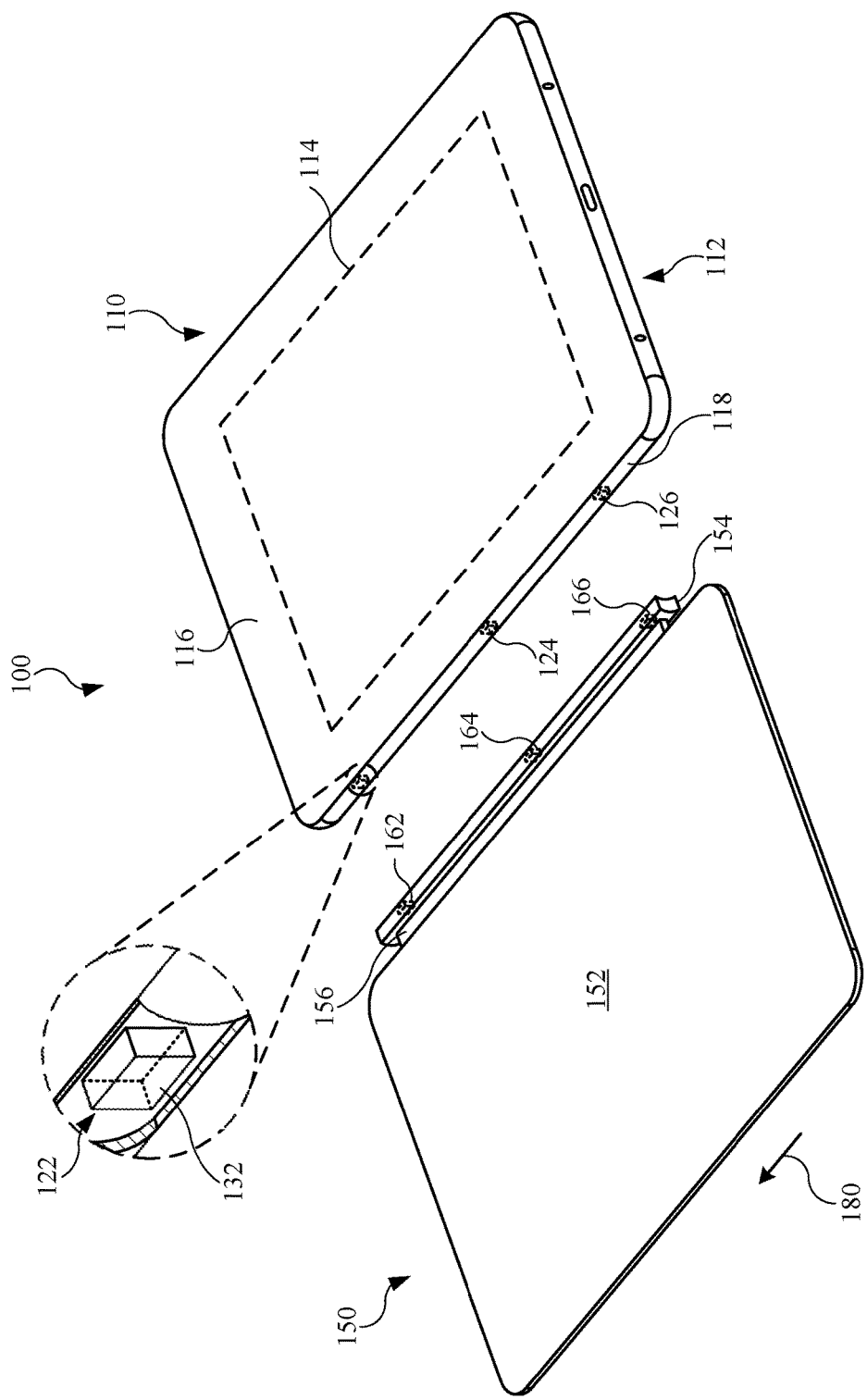
FIG. 1 illustrates an isometric view of an embodiment of a system that includes an electronic device and an accessory device, in accordance with the described embodiments.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments may be used, and changes may be made without departing from the spirit and scope of the described embodiments.

The following disclosure relates to a magnetic circuit, or magnetic coupling, between magnets. The magnets may be used to magnetically an electronic device with an accessory device. As an example, a magnetic circuit may be formed between a magnet in the electronic device and a magnet in the accessory device. Further, the following disclosure relates to a magnetic circuit designed to counteract lateral forces applied to the electronic device and/or the accessory device that may cause the electronic device and/or the accessory device to move laterally with respect to the other, and disrupt or cease the magnetic circuit between the magnets in the respective devices.

The magnetic circuit may provide a magnetic force between two magnets in a direction that is generally normal, or perpendicular, with the respect to the magnets. The magnetic force between the magnets can be approximated based upon the surface areas of the magnets that face one another. Also, a lateral force (applied to one of the magnets) required to overcome the magnetic force and move, or slide, the magnet can be approximated based upon a changing rate an overlapping surface area of a stationary (or non-moving) magnet overlapped by the moving (or sliding) magnet relative to the stationary magnet. An "overlapping surface area" or "overlapped surface area" as used throughout this detailed description and in the claims refers to an area of a surface (of a first magnet) that is directly facing, and/or overlapped by, a surface of a second magnet magnetically coupled with the first magnet. For example, two magnetically coupled square magnets, each having a surface of length L that faces one another, have an overlapping surface area of $L^2$ when the respective surfaces of length L are fully or completely aligned with one another. As another example, when one magnet (of the previously described square magnets) is offset with the other magnet by a distance L/2, then the overlapping surface area is $L^2/2$, as only half of the surface of the magnet is directly facing the surface of another magnet.

In the present embodiments, the magnets used in the electronic devices and accessory devices may include one or more surfaces designed such that when the magnets are coupled together, the work energy, as well as the force, required move at least one magnet laterally with respect to another magnet (to overcome the magnetic force) is increased, as compared to magnets having a basic rectangular design (such as the square magnets described above). For example, the magnets may include polygonal shapes such as a trapezoid or a triangle, both of which include at a surface having a side that is diagonal (not perpendicular) with respect to an adjacent side of the surface. Further, rather than simply using larger magnets having larger associated external magnetic fields, the surface area defined by polygonal shape may include a surface area substantially similar to that of traditional rectangular magnets. In other words, the magnets described herein are not intended to be substantially larger magnets as compared to square magnets. However, the force required to overcome the magnetic force between these magnets (having the polygonal shapes) is larger. As a result, when these magnets form a magnetic circuit used to magnetically couple an electronic device with an accessory device, the magnetic force between the magnets are more inclined to resist lateral forces acting on, for example, the accessory device, and the accessory device may remain aligned with the electronic device in a desired manner.

These and other embodiments are discussed below with reference to FIGS. 1-15. However, those skilled in the art will readily appreciate that the detailed description given herein with respect to these Figures is for explanatory purposes only and should not be construed as limiting.

FIG. 1 illustrates an isometric view of an embodiment of a system 100 that includes an electronic device 110 and an accessory device 150, in accordance with the described embodiments. In some embodiments, the electronic device 110 is a mobile wireless communication device, such as a smartphone. In the embodiment shown in FIG. 1, the electronic device 110 is a tablet computer device. The electronic device 110 may include an enclosure 112 formed from a metal, such as aluminum or aluminum alloy, or a rigid plastic. The enclosure 112 may define an internal cavity designed to receive internal components (not shown), such as a processor circuit, a memory circuit, and a battery, as non-limiting examples. The internal cavity may also receive one or more magnets. This will be discussed below. The electronic device 110 may further include a display assembly 114 (shown as a dotted line) designed to provide and present visual information. Further, in some embodiments, the display assembly 114 may include a capacitive sensor assembly that allows the display assembly 114 to receive an input or command by a capacitive coupling with the capacitive sensor assembly. Also, the electronic device 110 may further include a protective layer 116 formed from a transparent material that overlays the display assembly 114.

The enclosure 112 may include several sidewalls surrounding the display assembly 114 and the protective layer 116. For example, the enclosure 112 may include a sidewall 118. In addition to providing a protective outer feature for some components of the electronic device 110, the sidewall 118 may also provide an attachment region, or attachment surface, with the accessory device 150. In this regard, the electronic device 110 may include several magnets disposed in the internal cavity and proximate to the sidewall 118. For example, the electronic device 110 may include a first magnet 122, a second magnet 124, and a third magnet 126 disposed internally in the electronic device 110. The enlarged view shows partial cross sectional view of the electronic device 110 showing the first magnet 122 disposed in the electronic device 110. As shown, the first magnet 122 may include a surface 132 that is generally rectangular. The second magnet 124 and the third magnet 126 may be generally similar to that of the first magnet 122, and accordingly, may include a size and shape shown and described for the first magnet 122. Each of the first magnet 122, the second magnet 124, and the third magnet 126 may be designed to magnetically couple with a magnet of the accessory device 150. Accordingly, the first magnet 122, the second magnet 124, and the third magnet 126 may generate an external magnetic field (not shown) that passes through the sidewall 118. This will be described below. While FIG. 1 shows a discrete number of magnets in the electronic device 110, the number of magnets may vary in other embodiments. Also, the magnets described in this detailed description may magnetic materials such as neodymium, samarium, and ferrite, as non-limiting examples. Also, in some cases, the magnets in this detailed description may include a magnetic element having a material (such as iron) that is formed into a permanent magnet. However, the magnetic element may include any material previously described for a magnet.

The accessory device 150 may mate or couple with the electronic device 110. In this regard, the accessory device 150 may include a body 152 having a size and shape to cover the protective layer 116. The accessory device 150 may be formed from smooth material, such as leather, silicone, fabric (including microfiber), or a combination thereof, in order to prevent damage to the protective layer 116. The accessory device 150 may include an attachment feature 154 designed to engage the electronic device 110 at the sidewall 118, and further include a hinge 156 formed from a flexible material designed to allow the body 152 to rotate or pivot with respect to the attachment feature 154, thereby allowing the body 152 to cover the protective layer 116 when the attachment feature 154 engages the sidewall 118. Also, although not shown, the body 152 may include multiple segments allowing the body 152 to bend or fold at a location (or locations) between the multiple segments. This may allow the body 152 to define a support feature (not shown), including a triangular support feature, designed to abut the enclosure 112 and support the accessory device 150 in an upright, or at least partially upright, configuration.

Also, the attachment feature 154 may include several magnets. As shown, the attachment feature 154 includes a first magnet 162, a second magnet 164, and a third magnet 166. Each of the first magnet 162, the second magnet 164, and the third magnet 166 may include a size and shape shown and described for the first magnet 122 in the electronic device 110. In order to pair the accessory device 150 with the electronic device 110, the magnets of the accessory device 150 may magnetically couple the magnets of the electronic device 110. For example, the first magnet 122 of the electronic device 110 may magnetically couple and form a magnetic circuit with the first magnet 162 of the accessory device 150. Also, a magnet in the electronic device 110 may be referred to as "an electronic device magnet" or "a device magnet," and a magnet in the accessory device 150 may be referred to as "an accessory device magnet" or "an accessory magnet." Also, for the purpose of pairing the electronic device 110 with the accessory device 150, the number of the magnets in the electronic device 110 may be the same as the number of magnets in the accessory device 150, and vice versa. However, both the electronic device 110 and the accessory device 150 may include additional magnets (not shown) designed to serve different purposes, such as forming the aforementioned support structure of the accessory device 150.

Figure 2:
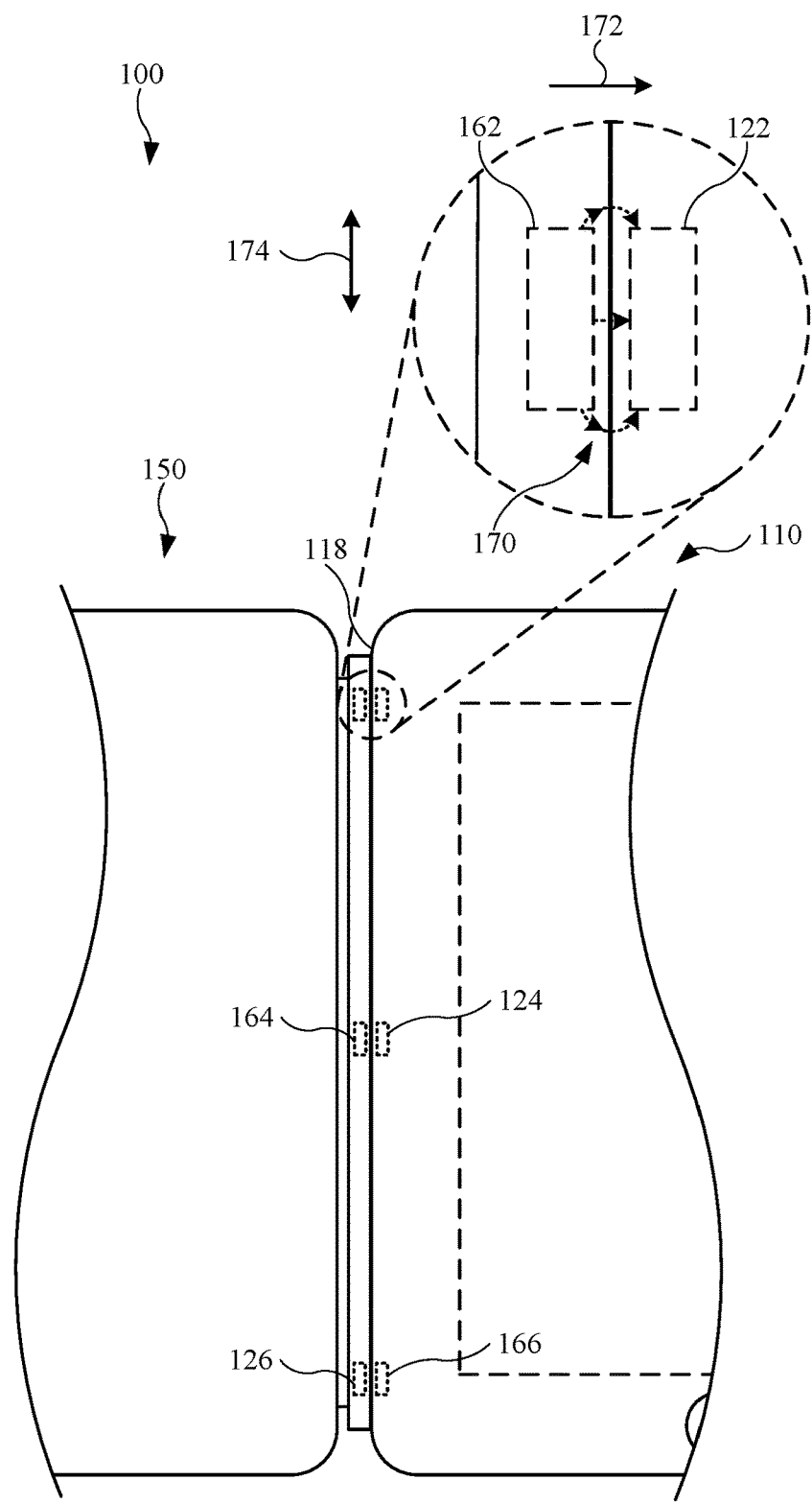
FIG. 2 illustrates a partial plan view of the system shown in FIG. 1, further showing the electronic device magnetically coupled with the accessory device.

FIG. 2 illustrates a partial plan view of the system 100 shown in FIG. 1, further showing the electronic device 110 magnetically coupled with the accessory device 150. As shown in the enlarged view, the first magnet 122 in the electronic device 110 may magnetically couple with the first magnet 162 of the accessory device 150, with external magnetic field lines 170 extending from the first magnet 162 of the accessory device 150 in a direction toward the first magnet 122 of the electronic device 110. In this regard, the first magnet 162 of the accessory device 150 may include a north facing polarity, or North Pole, aligned with a south facing polarity, or South Pole, of the first magnet 122 in the electronic device 110. However, in some embodiments, the magnetic polarities may be changed in a manner that still forms a magnetic coupling between the first magnet 122 in the electronic device 110 and the first magnet 162 in the accessory device 150. Also, the second magnet 124 and the third magnet 126 of the electronic device 110 may magnetically couple with the second magnet 164 and the third magnet 166, respectively, of the accessory device 150, to form magnetic circuits in a manner similar to the magnetic circuit formed between the first magnet 122 in the electronic device 110 and the first magnet 162 of the accessory device 150. These magnetic circuits may combine to provide a magnetic force that maintains the accessory device 150 with the electronic device 110.

Also, FIG. 2 shows a first arrow 172 indicating a direction of magnetic force, or magnetic pull force, of the magnetic circuits between the magnets. As shown, the direction of the first arrow 172 indicates the magnetic force is normal, or perpendicular, with respect to the first magnet 122 of the electronic device 110 and the first magnet 162 of the accessory device 150. In other words, the force component of the magnetic force is normal with respect to the magnets. However, the magnetic force may provide little or no lateral magnetic force in either direction of a second arrow 174 (a double-sided arrow) that is perpendicular with the respect to the force represented by the first arrow 172. As shown, the directions of the second arrow 174 are parallel, or approximately parallel, with respect to the sidewall 118. In some cases, a lateral force, or shearing force, applied to the electronic device 110 or the accessory device 150 in the directions represented by the second arrow 174 may overcome the magnetic force of the magnetic circuits, causing the electronic device 110 to decouple from the accessory device 150 in an undesired manner.

FIG. 3 illustrates a plan view of an embodiment of a magnet 220, in accordance with the described embodiments.

The magnets shown and described in FIGS. 1 and 2 may be substantially similar to the magnet 220 in terms of size and shape, as well as other features described herein. As shown, the magnet 220 may include a surface 222 having a rectangular shape. This may include a square shape. Also, FIG. 3 shows a first imaginary line 232 (or first centerline) passing through a center point 234 of the surface 222. A "center point" of a surface may be referred to as a midpoint of a surface in two different dimensions, such as a "lengthwise dimension" and a "widthwise dimension." The first imaginary line 232 may partition a widthwise dimension of the surface 222 into two symmetric sections of the surface 222. Further, a second imaginary line 236 (or second centerline), perpendicular to the first imaginary line 232, may pass through the center point 234, and may also partition a lengthwise dimension of the surface 222 into two symmetric sections of the surface 222. In this regard, the surface 222 may be referred to as having a symmetric area profile. This will be discussed below.

FIG. 4 illustrates an isometric view of a pair of magnets magnetically coupled together. As shown, the pair of magnets includes a first magnet 320 and a second magnet 330. The first magnet 320 and the second magnet 330 may include any features previously described for the magnet 220 (shown in FIG. 3), including surfaces having symmetric area profiles. Also, the first magnet 320 and the second magnet 330 may include a size and a shape similar to one another such that a first surface 322 of the first magnet 320 is similar in size and shape to that of a second surface (partially shown by dotted lines and facing of the first surface 322) of the second magnet 330.

Also, as shown, the first magnet 320 is facing and fully aligned with the second magnet 330. In particular, the first surface 322 is fully aligned with the second surface of the second magnet 330. Two magnets may be "fully aligned" with one another when the location of one magnet mirrors a location of another magnet. Similar, two surfaces may be "fully aligned" with one another when the location of one surface mirrors a location of another surface. Also, in this detailed description, two surfaces that are fully aligned with one another may refer to two surfaces (of different magnets) having as similar size and shape, and accordingly, a similar number of edges, with each edge of one surface in corresponding location to an edge of the other surface, as shown in FIG. 4. For example, as shown in FIG. 4, a first surface 322 of the first magnet 320 is fully aligned with a second surface (partially shown by dotted lines) of the second magnet 330. Also, both the first surface 322 and the second surface may include a square shape having a side dimension of length L and, accordingly, a surface area of $L^2$.

FIG. 4 illustrates a shaded area across the first surface 322, with the shaded area representing an overlapping surface area. The first surface 322 is entirely shaded due to the first magnet 320 being fully aligned with, and overlapped (or overlain) by, the second magnet 330. In this regard, the second surface of the second magnet 330 may include an overlapping surface area entirely covering the first surface 322, and is substantially similar in size and shape as that of the shaded area of the first surface 322. Conversely, although not shown, the overlapped surface area of the second surface is completely shaded based on the overlap of the first magnet 320 by the first surface 322 of the first magnet 320.

The magnetic energy W can be related to the magnetic force $F_M$, or magnetic pulling force, in a direction denoted by the arrow 340 between the first magnet 320 and the second magnet 330 separated by a gap distance G. For example, the magnetic energy W may be approximated by $$W = \frac{B^2 V}{2\mu_0} = \frac{B^2 AG}{2\mu_0}$$

where B is the flux density (measured in tesla), V is the volume of air space between the first magnet 320 and the second magnet 330, A is the overlapped surface area (the shaded area), and $\mu_0$ is the permeability in space. Accordingly, the magnetic force $F_M$ (related to work energy W) between the first magnet 320 and the second magnet 330 may be proportional, or approximately proportional, to the overlapped surface area A, which is equal to $L^2$. Further, the change in work energy $\Delta W$ required to overcome the magnetic force $F_M$ and move the second magnet 330 laterally with the respect to the first magnet 320 (or vice versa) by a distance D may be approximated by $$\Delta W = F_M * D$$

without accounting for frictional forces between two parts that contact one another and carry the magnets forming the magnetic circuit. For example, the two parts may include the electronic device 110 and the accessory device 150 (shown in FIGS. 1 and 2). Accordingly, similar to the magnetic force $F_M$, the work energy W may also be proportional, or approximately proportional, to the overlapped surface area A.

FIG. 5 illustrates an isometric view of the pair of magnets shown in FIG. 4, further showing the magnets offset with one another. Accordingly, the first magnet 320 is no longer fully aligned with the second magnet 330. As shown, the second magnet 330 is moved relative to the first magnet 320 by a distance D. As an example, suppose the distance D is one-half the distance of the side dimension L, such that D=L/2. The overlapped surface area 324, also having a symmetric area profile, may include a surface area equal to half of the first surface 322, or $L^2/2$. Further, the change in work energy $\Delta W$ may be proportional to the change in overlapped surface area given by $$\Delta W \propto \left( L^2 - \frac{L^2}{2} \right) = \frac{L^2}{2}$$

with the change in work energy $\Delta W$ representing the work energy required to move the second magnet 330 laterally a distance D (or L/2) with respect to the first magnet 320. This, again, ignores frictional forces. When moving or sliding the second magnet 330 with respect to the first magnet 320 by a distance D, the force, or average force, F, may be approximated by $$F = \frac{\Delta W}{D} = \frac{B^2 \Delta V}{2\mu_0 D}.$$

where $\Delta V$ represents the change of volume of air space between as the second magnet 330 moves with respect to the first magnet 320. Because the gap distance G is constant, the force may be approximated as $$F = \frac{B^2 G \Delta A}{2\mu_0 D}.$$

where ΔA represents the change in overlapped surface area as the second magnet 330 moves with respect to the first magnet 320. Furthermore, the force F required to move, or laterally displace, the second magnet 330 with respect to the first magnet 320 by a distance D may be expressed as $$F \propto \frac{\Delta W}{D} = \frac{\Delta A}{D} = \frac{L^2}{2} / \frac{L}{2} = L.$$

Accordingly, as shown above, the force F may be proportional to the change in overlapped surface area, as well as the length L, or side dimension, of one of the magnets.

Returning again to FIG. 1, assume the first magnet 122 of the electronic device 110 and the first magnet 162 of the accessory device 150 include a size and shape similar to those of the first magnet 320 and the second magnet 330 (shown in FIGS. 4 and 5), respectively. The total force F required to move the accessory device 150 laterally with respect to the electronic device 110 in a direction of an arrow 180 may be a summation of the individual forces required to move the each magnet in the accessory device 150 laterally with respect to a magnet in the electronic device 110 (to which the magnets in the accessory device 150 are magnetically coupled). In this case, since three magnets are shown in each of the accessory device 150 and the electronic device 110, the total force F may be proportional to 3 L.

Generally, when the electronic device 110 is magnetically coupled with the accessory device 150, it is undesirable for the accessory device 150 to move laterally with respect to the electronic device 110 (or vice versa). In order to limit, or prevent, the accessory device 150 from moving laterally with respect to the electronic device 110, it may be desirable to increase the amount of work and force required to move the accessory device 150 laterally with respect to the electronic device 110. This may require the use of magnets having different shapes and sizes.

Figure 6:
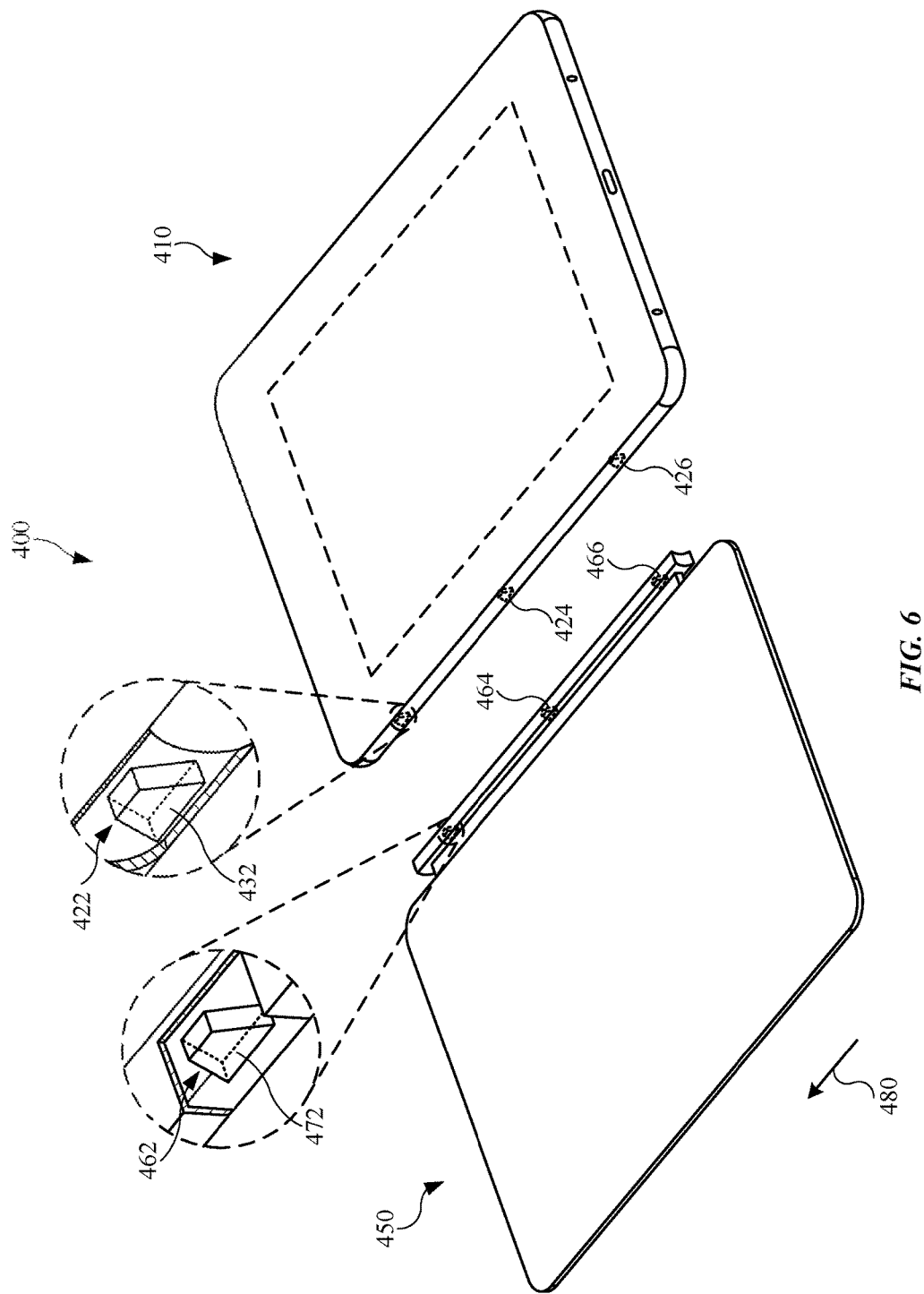
FIG. 6 illustrates an isometric view of an alternate embodiment of a system that includes an electronic device and an accessory device, in accordance with the described embodiments.

FIG. 6 illustrates an isometric view of an alternate embodiment of a system 400 that includes an electronic device 410 and an accessory device 450, in accordance with the described embodiments. The electronic device 410 and the accessory device 450 may include any feature or features previously described for an electronic device and an accessory device, respectively. However, the magnets may include different sizes and shapes. For example, the electronic device 410 may include several magnets, such as a first magnet 422, a second magnet 424, and a third magnet 426. As shown in the enlarged view, the first magnet 422 may include a surface 432 having a polygonal shape different than previously described embodiments. For example, as shown in FIG. 6, the surface 432 may include a polygonal surface in the form of a trapezoid known to include at least one side that is diagonal (non-perpendicular) with respect to an adjacent side. In some embodiments (not shown), the surface 432 includes five or more sides. The second magnet 424 and the third magnet 426 may a size and shape similar to that of the first magnet 422.

Also, FIG. 6 shows the accessory device 450 having a first magnet 462, a second magnet 464, and a third magnet 466. As shown in the enlarged view, the first magnet 462 may include a surface 472 having a shape similar to that of the surface 432 of the first magnet 422 of the electronic device 410. Accordingly, the surface 472 may include a polygonal surface in the form of a trapezoid. The first magnet 462 of the accessory device 450 may also include a surface (partially shown by dotted lines) similar to the surface 472, with the aforementioned surface facing the surface 432 and having a size and shape substantially similar to that of the surface 432. Also, the first magnet 462, the second magnet 464, and the third magnet 466 may include a size and shape similar to that of the first magnet 422 of the electronic device 410. Also, when the electronic device 410 is magnetically coupled with the accessory device 450, the first magnet 422, the second magnet 424, and the third magnet 426 may form a magnetic coupling with the first magnet 462, the second magnet 464, and the third magnet 466, respectively. Also, while FIG. 6 shows a discrete number of magnets, the number of magnets in each device may vary in other embodiments.

FIG. 7 illustrates a plan view of an alternate embodiment of a magnet 520, in accordance with the described embodiments. As shown, the magnet 520 includes a surface 522 having a polygonal shape, which may include a trapezoidal shape. However, other polygonal shapes having the same or a different number of sides are possible. Also, an imaginary line 532 passes through a center point 534 of the surface 522, partitioning the surface 522 into a first section 542, or first surface section, and a second section 544, or second surface section. As shown, the first section 542 is dissimilar from the second section 544 in that the first section 542 includes a smaller surface area than that of the second section 544. Accordingly, contrary to the surface 222 shown in FIG. 3, the surface 522 in FIG. 7 may be partitioned into two dissimilar sections based on an imaginary line 532 passing through the center point 534 of the surface 522, and in this regard, the surface 522 of the magnet 520 may be characterized as having a surface with an asymmetric surface area profile. Also, the magnets shown and described in FIG. 6 may include a size, shape, and any other feature of the magnet 520 shown in FIG. 7.

FIG. 8 illustrates an isometric view of a pair of magnets magnetically coupled together. As shown, the pair of magnets includes a first magnet 620 and a second magnet 630. The first magnet 620 and the second magnet 630 may include any features previously described for the magnet 520, shown in FIG. 7. Also, the first magnet 620 and the second magnet 630 may include a size and a shape similar to one another. As shown, the first magnet 620 is fully aligned with the second magnet 630 such that a first surface 622 of the first magnet 620 is facing and fully aligned with a second surface (partially shown by dotted lines) of the second magnet 630. The second surface of the second magnet 630 may include a similar size and shape as that of the first surface 622.

As shown in FIG. 8, the first magnet 620 and the second magnet 630 may include a surface (or surfaces) having a trapezoid shape, as opposed to the rectangular surfaces of the first magnet 320 and the second magnet 330 (shown in FIG. 4). However, the first magnet 620 and the second magnet 630 may each include a surface (such as the first surface 622 of the first magnet 620) having a surface area $L^2$, with each surface having a surface equal to the surface areas of the surfaces of the first magnet 320 and the second magnet 330 (shown in FIG. 4). For example, the first surface 622 may include a first side dimension, or first base dimension, of length L. For purposes of clarity, the dimensions of the second magnet 630 are labeled. However, the first magnet 620 and the second magnet 630 may be substantially similar in size and shape, and may include surfaces of the same size and shape. In addition, the first surface 622 may include a second side dimension, or second base dimension, of length L/2. Further, the first surface 622 may include a height H that is 4 L/3. According to the equation for a surface area of a trapezoid, the first surface 622 may include a surface area S of $$S = \frac{(B1 + B2)}{2} * H$$

where B1 and B2 are the bases of the trapezoid and H is the height. Accordingly, the first surface 622 may include a surface area of $$S = \frac{(L + L/2)}{2} * \frac{4}{3}L = L^2$$

which is the same as the surface area of the first surface 322 (shown in FIG. 4). Also, the second surface (facing the first surface 622) of the second magnet 630 may include a surface area substantially similar to that of the first surface 622.

Also, FIG. 8 illustrates a shaded area fully encompassing the first surface 622, with the shaded area representing an overlapping surface area of the first surface 622 first magnet 620. While not shown, the second surface of the second magnet 630 may include an overlapping surface area entirely covering the second surface. The first surface 622 is completely shaded due to the first surface 622 of the first magnet 620 facing and fully aligned with the second surface of the second magnet 630. When the first magnet 620 and the second magnet 630 are sufficiently close to one another, the magnetic force $F_M$, or magnetic pulling force, in a direction denoted by the arrow 640, between the first magnet 320 and the second magnet 330 may, again, be proportional, or approximately proportional, to the overlapped surface area (the shaded area). Further, as previously described, the work energy W required to overcome the magnetic force $F_M$ and move the second magnet 630 laterally with the respect to the first magnet 620 (or vice versa) by a distance D may be determined from dividing a force F (applied laterally to the second magnet 630) by the distance D, and the work energy W may again be proportional, or approximately proportional, to the overlapped surface area.

FIG. 9 illustrates an isometric view of the pair of magnets shown in FIG. 8, further showing the magnets offset with one another. As shown, the second magnet 630 is moved relative to the first magnet 620 by a distance D, the same distance D as shown in FIG. 5. Accordingly, the distance D is again one-half the distance of the side dimension L, such that D=L/2, and an overlapped surface area 624 becomes 2 $L^2/3$. Also, it should be noted that the overlapped surface area 624 may include an asymmetric surface area profile in a manner previously described. Accordingly, the overlapped surface area 624 may be partitioned by a centerline passing through a center point of a surface defined by the overlapped surface area 624, with the centerline forming two dissimilar sections in a manner previously described. The change in work energy ΔW may be proportional to the change in overlapped surface area such that $$\Delta W \propto \left( L^2 - \frac{2L^2}{3} \right) = \frac{2L^2}{3}$$

with the change in work energy ΔW representing the work energy required to move the second magnet 630 laterally a distance D (or L/2) with respect to the first magnet 620. This, again, ignores frictional forces. Furthermore, the force F required to move, or laterally displace, the second magnet 630 with respect to the first magnet 620 by a distance D may be expressed as $$F \propto \frac{\Delta W}{D} = \frac{2L^2}{3} / \frac{L}{2} = \frac{4L}{3}.$$

As shown above, the force F is proportional to the length L. This suggests that the first magnet 620 and the second magnet 630, while each having the same surface area, $L^2$ (first surface 622), as that of the first magnet 320 and the second magnet 330, respectively (shown in FIG. 5), may nonetheless require 33% additional force (4 L/3 compared to L) to move the second magnet 630 laterally with respect to the first magnet 620 by the same distance D, as compared to the first magnet 320 and the second magnet 330 (shown in FIG. 5), assuming the same magnetic materials or magnetic elements are used for the aforementioned magnets. Thus, the magnetic material of the first magnet 620 and the second magnet 630 shown in FIGS. 8 and 9 may be the same as that of the first magnet 320 and the second magnet 330 shown in FIGS. 4 and 5, while still achieving the 33% additional force requirement (to move the second magnet 630 relative to the first magnet 620 by a distance D).

Returning again to FIG. 6, assume the electronic device 410 and the accessory device 450 are magnetically coupled by their respective magnets, and the magnets include trapezoidal magnets having a size and shape similar to those of the first magnet 620 and the second magnet 630 (shown in FIGS. 8 and 9). The lateral force required to move the accessory device 450 laterally with respect to the electronic device 410 in a direction of an arrow 480 may be a summation of the individual forces required to move the magnets in the accessory device 450 with respect to the magnets in the electronic device 410. In this case, since three magnets are shown in each of the accessory device 450 and the electronic device 410, the force F may be proportional to 4 L. Accordingly, the force required to move the accessory device 450 laterally may increase based upon using trapezoidal magnets, such as the first magnet 620 and the second magnet 630 shown and described in FIGS. 8 and 9, as compared to rectangular magnets of similar size.

Also, the first magnet 620 and the second magnet 630 shown in FIGS. 8 and 9 may include a surface that may be partitioned into two dissimilar surfaces in a manner similar to that of the magnet 520 (shown in FIG. 7). For example, FIG. 9 shows the second magnet 630 having an imaginary line 632 passing through a center point 636 of a surface 638 such that the surface 638 may include two dissimilar section. This suggests that the second magnet 630, when moving in a direction parallel to a line passing through the surface 638 that defines the asymmetric surface area profile may require an increased lateral force in order to move the second magnet 630, as compared to rectangular magnets. Accordingly, a pair of magnets magnetically coupled to one another and capable of partitioning into dissimilar sections of different surface areas (from a line extending through the center point of the surface in a manner previously described) may require additional lateral force as compared to two rectangular, or square magnets, such as the first magnet 320 and the second magnet 330 shown in FIGS. 4 and 5, as the first magnet 320 and the second magnet 330 include surfaces with two sets of parallel sides and do not include a surface capable of partitioning into dissimilar sections (from a line extending through the center point of the surface in a manner previously described).

Figure 10:
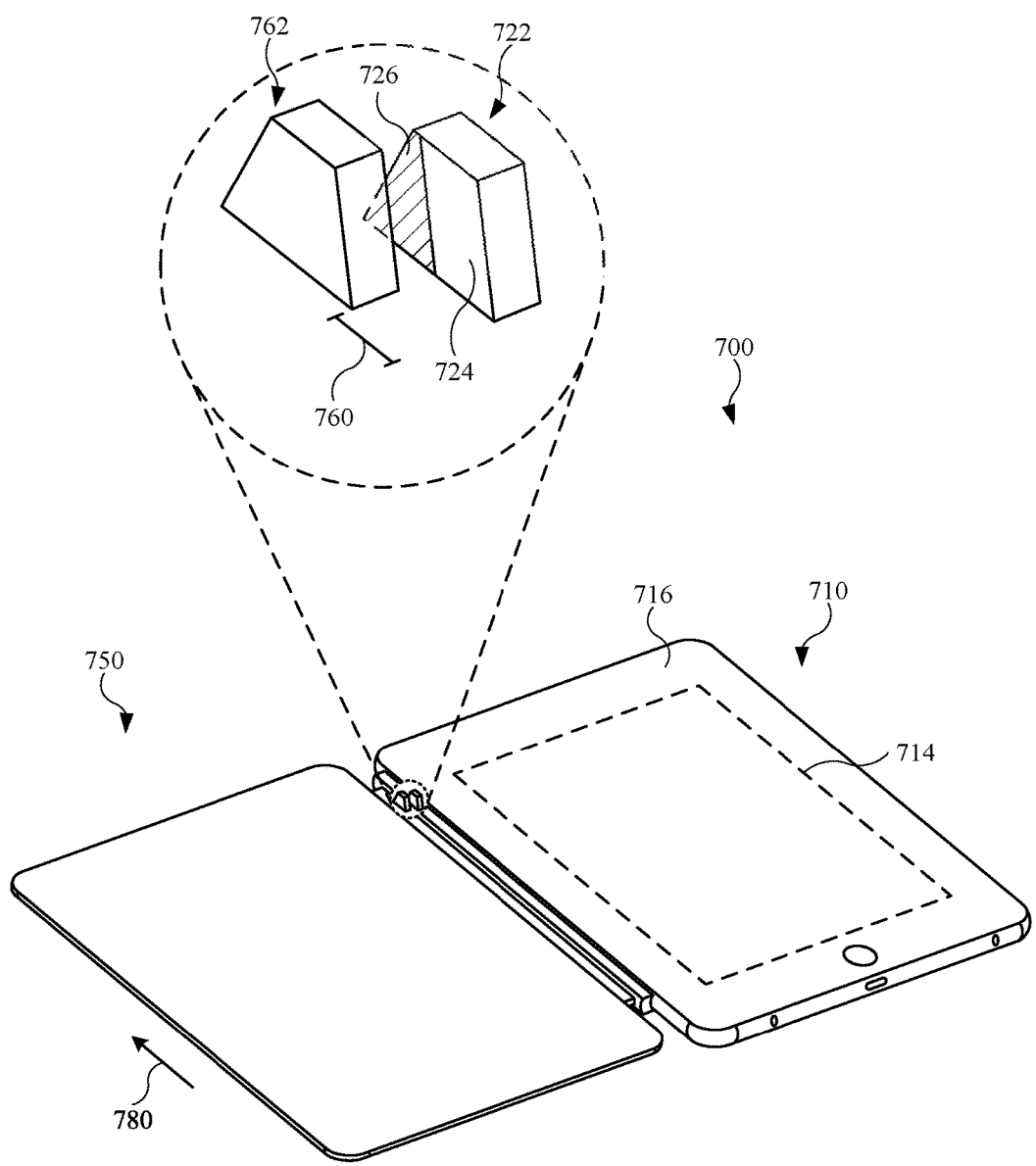
FIG. 10 illustrates an isometric view of an alternate embodiment of a system that includes an electronic device and an accessory device, in accordance with the described embodiments.

FIG. 10 illustrates an isometric view of an alternate embodiment of a system 700 that includes an electronic device 710 and an accessory device 750, in accordance with the described embodiments. The electronic device 710 and the accessory device 750 may include any feature or features previously described for an electronic device and an accessory device, respectively. As shown, the electronic device 710 may include a magnet 722 having a surface 724 that includes a trapezoid shape, and the accessory device 750 may include a magnet 762 having a substantially similar size and shape as that of the magnet 722. Also, in order to magnetically couple the electronic device 710 with the accessory device 750, the magnet 722 may be magnetically coupled with the magnet 762 to form a magnetic assembly.

As shown, a force in the direction of an arrow 780 applied to the accessory device 750 may cause the accessory device 750 to become offset with respect to the electronic device 710, placing the system in an offset configuration. An "offset configuration" may be referred to a configuration when the accessory device 750 is not aligned top-to-bottom with the electronic device 710, and the accessory device 750 may not fold over the electronic device 710 and fully cover a display assembly 714 and a protective layer 716 of the electronic device 710. Furthermore, the offset configuration may correspond to magnets used to magnetically couple the electronic device 710 with the accessory device 750 not fully aligned with one another. For example, in the enlarged view, the magnet 762 in the accessory device 750 is offset with respect to the magnet 722 in the electronic device 710 by a distance 760. The distance 760 may also represent an amount of offset between the accessory device 750 and the electronic device 710. Other magnets (not shown) in the electronic device 710 may be offset with magnets (not shown) in the accessory device 750 in a manner similar to the magnets in the enlarged view. Further, a portion of the surface 724 includes an overlapped surface area 726 that is partially overlapped by a surface (not shown) of the magnet 762, with the surface of the magnet 762 having a substantially similar size and shape as that of the surface 724 of the magnet 722. As shown, the overlapped surface area 726, like the surface 724, may include an asymmetric surface area profile.

Figure 11:
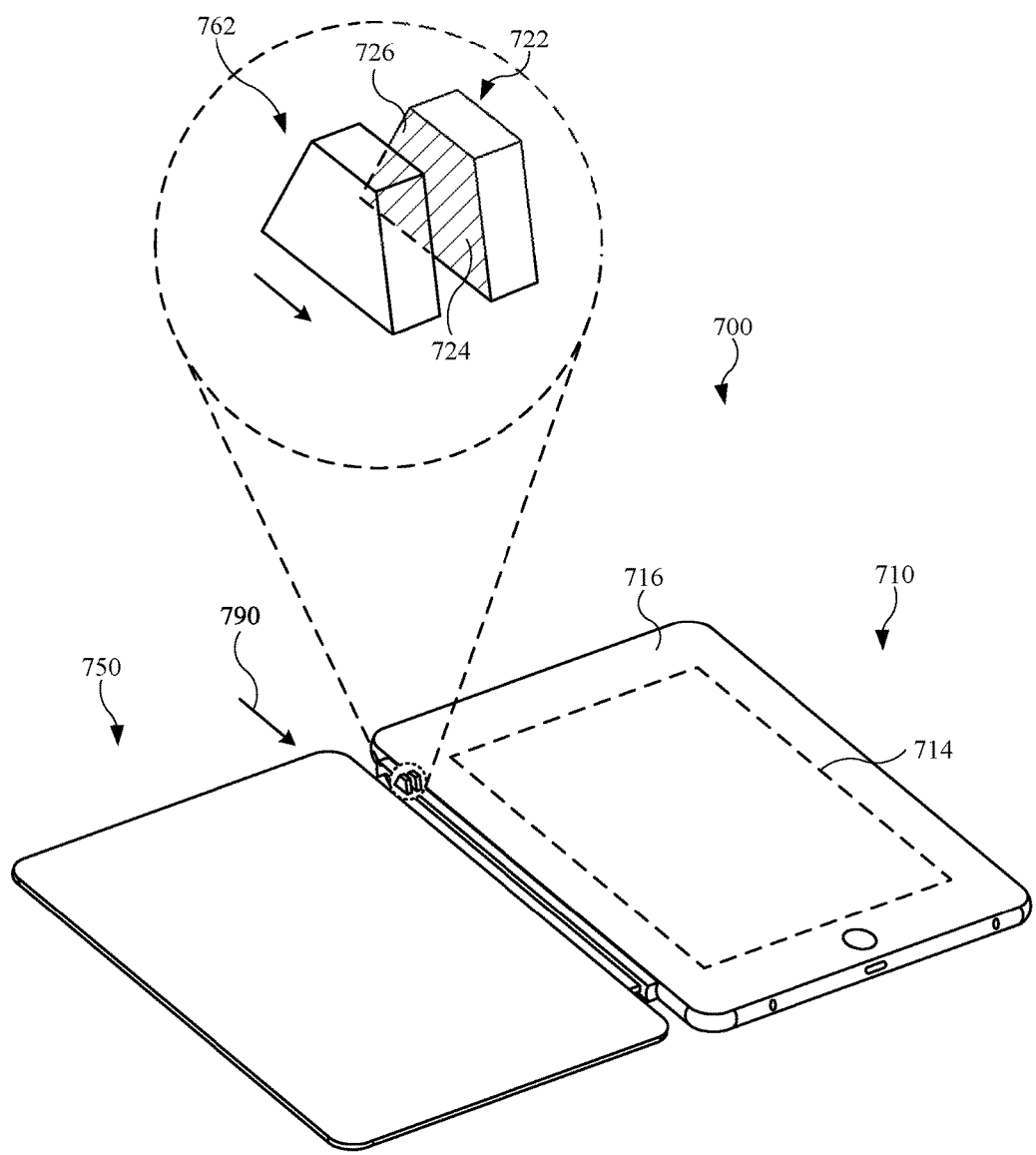
FIG. 11 illustrates an isometric view of the system shown in FIG. 10, further showing the magnetic attraction force between the magnet of the electronic device and the magnet of the accessory device returning the accessory device to an aligned configuration.

Due in part to the shape of the magnet 722 in the electronic device 710 and shape of the magnet 762 in the accessory device 750, the lateral force in the direction of the arrow 780 applied to the accessory device 750 may be insufficient to maintain the accessory device 750 offset with respect to the electronic device 710 by the distance 760, and when the force in the direction of the arrow 780 is no longer applied, the accessory device 750 may return to an aligned configuration with respect to the electronic device 710. For example, FIG. 11 illustrates an isometric view of the system 700 shown in FIG. 10, further showing the magnetic attraction force between the magnet 722 of the electronic device 710 and the magnet 762 of the accessory device 750 returning the accessory device 750 to an aligned configuration. An "aligned configuration" may be referred to a configuration when the accessory device 750 is aligned top-to-bottom with the electronic device 710, and the accessory device 750 may fold over the electronic device 710 to fully cover the protective layer 716 and the display assembly 714. Furthermore, the aligned configuration may correspond to magnets used to magnetically couple the electronic device 710 with the accessory device 750 being fully aligned with one another (see FIG. 8, for example). The magnetic attraction force formed by a magnet coupling between the magnet 722 of the electronic device 710 and the magnet 762 of the accessory device 750 may provide sufficient counterforce in the form of a lateral restoring force that causes the magnet 762 to align with the magnet 722, and accordingly, causing the accessory device 750 to align with the electronic device 710 (shown in FIG. 11), with the lateral restoring force shown in a direction of an arrow 790 opposite the direction of the arrow 780 (shown in FIG. 10). As such, the magnet 722 of the electronic device 710 is aligned with the magnet 762 of the accessory device 750, and the surface 724 of the magnet 722 is entirely an overlapped surface area. The aligned configuration for remaining magnetic pairs (not shown) of the electronic device 710 and the accessory device 750 may be similar to what is shown in FIG. 11.

Based on the comparison between rectangular magnets and trapezoidal magnets, the force in the direction of the arrow 780 may include a force that causes an accessory device having square magnets (see FIG. 2) to become permanently offset with the respect to the electronic device (see FIG. 2). However, as exemplified in FIG. 11, the same amount of force in the direction of the arrow 780 may be include a force insufficient to cause the accessory device 750 to remain permanently offset with respect to the electronic device 710, as the trapezoidal magnets shown in FIG. 11 require additional force to permanently offset the accessory device 750 with respect to the electronic device 710.

Figure 12:
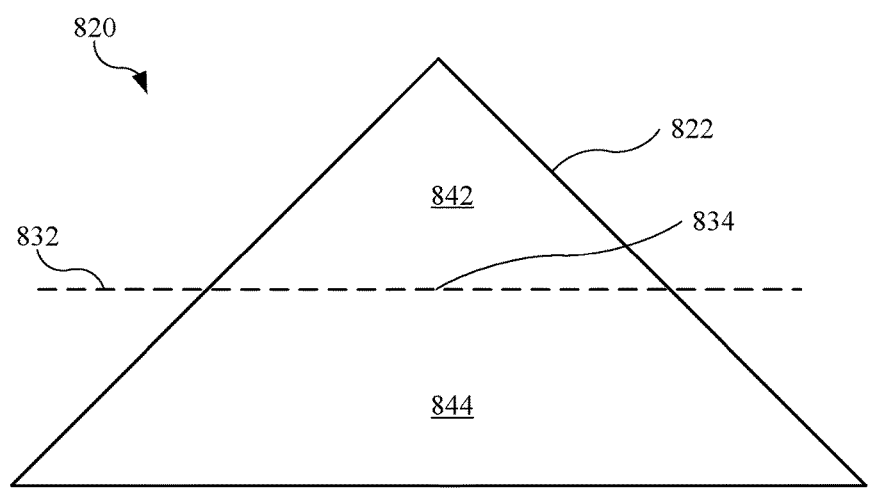
FIG. 12 illustrates a plan view of an alternate embodiment of a magnet, in accordance with the described embodiments.

Magnets of other shapes and sizes may be used in electronic devices and the accessory devices that increase the force required laterally move the magnets (when magnetically coupled together), as compared to rectangular magnets. For example, FIG. 12 illustrates a plan view of an alternate embodiment of a magnet 820, in accordance with the described embodiments. As shown, the magnet 820 includes a surface 822 having a polygonal shape, which may include a triangular shape. However, other polygonal shapes having additional sides are possible. Also, FIG. 12 shows an imaginary line 832 passing through a center point 834 of the surface 822. The imaginary line 832 may partition the surface 822 into a first section 842, or first surface section, and a second section 844, or second surface section. As shown, the first section 842 is less that the second section 844, in terms of surface area. Accordingly, as compared to the surface 222 shown in FIG. 3, the surface 822 in FIG. 12 may be partitioned into two dissimilar sections based on an imaginary line 832 passing through the center point 834 of the surface 822, and in this regard, the surface 822 of the magnet 820 may be characterized as having an asymmetric surface area profile.

Figure 13:
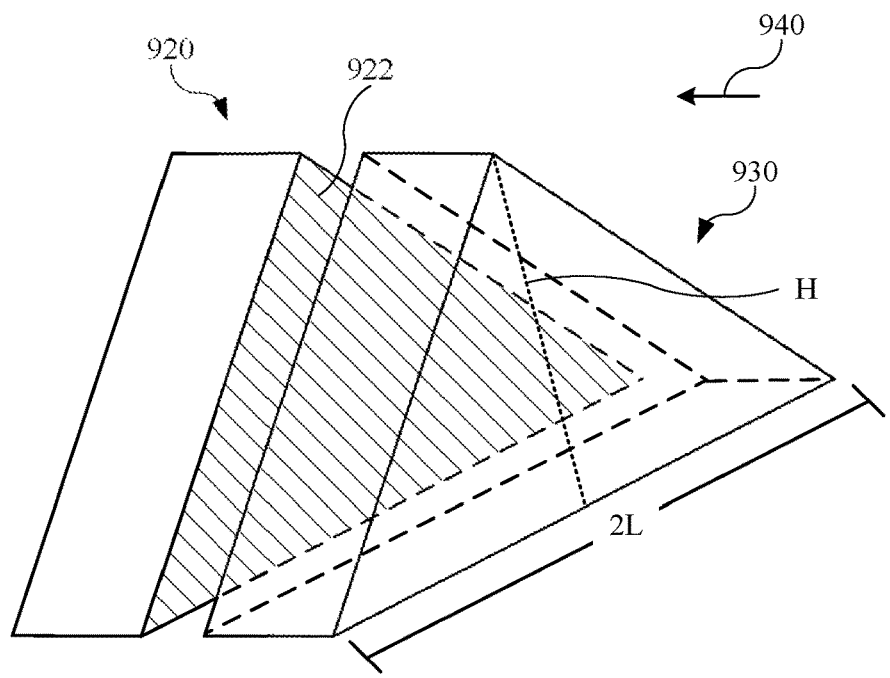
FIG. 13 illustrates an isometric view of a pair of magnets magnetically coupled together, in accordance with the described embodiments.

FIG. 13 illustrates an isometric view of a pair of magnets magnetically coupled together. As shown, the pair of magnets includes a first magnet 920 and a second magnet 930. The first magnet 920 and the second magnet 930 may include any features previously described for the magnet 820 (shown in FIG. 12). Also, the first magnet 920 and the second magnet 930 may include a size and a shape similar to one another. Also, the first magnet 920 includes a first surface 922 that is facing and aligned with a second surface (not shown) of the second magnet 930 that magnet. The second surface (of the second magnet 930) may include a similar size and shape as that of the first surface 922.

As shown in FIG. 13, the first magnet 920 and the second magnet 930 each include a surface (or surfaces) having a triangular shape, as opposed to the rectangular surfaces of the first magnet 320 and the second magnet 330 (shown in FIG. 4). However, the first magnet 920 and the second magnet 930 may each include a surface (such as the first surface 922 of the first magnet 920) having a surface area $L^2$, with each surface having a surface equal to the surface areas of the surfaces of the first magnet 320 and the second magnet 330 (shown in FIG. 4). For example, the first surface 922 may include a side dimension of length 2 L. For purposes of clarity, the dimensions of the second magnet 930 are labeled. However, the first magnet 920 and the second magnet 930 may be substantially similar in size and shape, and may include surfaces of the same size and shape. In addition, the first surface 922 may include a height H that is equal to length L. According to the equation for a surface area for a triangle, the first surface 922 may include a surface area S of $$S = \frac{(B*H)}{2}$$

where B is the base and of the triangle and H is the height. Accordingly, the first surface 922 may include a surface area of $$S = \frac{(H*2L)}{2} = \frac{(L*2L)}{2} = L^2$$

which is the same as the surface area of the first surface 322 (shown in FIG. 4). Also, the second surface (facing the first surface 922) of the second magnet 930 may be substantially similar in surface area to that of the first surface 922.

Also, FIG. 13 illustrates a shaded area fully encompassing the first surface 922, with the shaded area representing an overlapping surface area of the first surface 922 of first magnet 920. While not shown, the second surface of the second magnet 930 may include an overlapping surface area entirely covering the second surface. The first surface 922 is completely shaded due to the first surface 922 of the first magnet 920 facing and fully aligned with the second surface of the second magnet 930. When the first magnet 920 and the second magnet 930 are sufficiently close to one another, the magnetic force $F_M$, or magnetic pulling force, in a direction denoted by the arrow 940 between the first magnet 920 and the second magnet 930 may, again, be proportional, or approximately proportional, to the overlapped surface area (the shaded area). Further, as previously described, the work energy W required to overcome the magnetic force $F_M$ and move the second magnet 930 laterally with the respect to the first magnet 920 (or vice versa) by a distance D may be determined from dividing a force F (applied laterally to the second magnet 930) by the distance D, and the work energy W may again be proportional, or approximately proportional, to the overlapped surface area.

Figure 14:
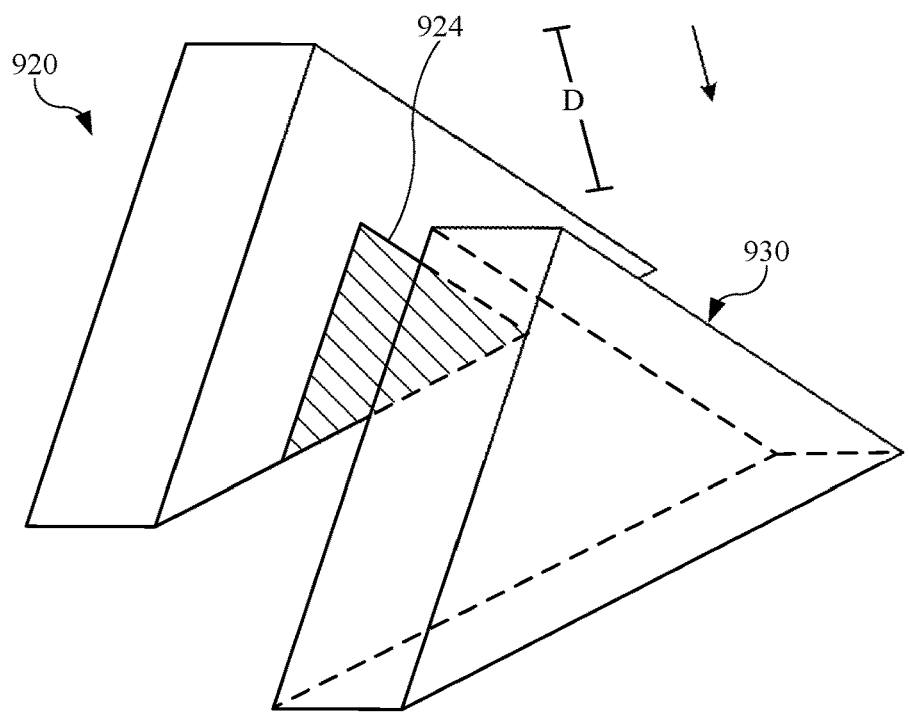
FIG. 14 illustrates an isometric view of the pair of magnets shown in FIG. 13, further showing the magnets offset with one another.

FIG. 14 illustrates an isometric view of the pair of magnets shown in FIG. 13, further showing the magnets offset with one another. As shown, the second magnet 930 is moved and offset from the first magnet 920 by a distance D, the same distance D as shown in FIG. 5. Suppose, again, the distance D is one-half the distance of the side dimension L, such that D=L/2. The overlapped surface area 924 becomes $L^2/4$. The overlapped surface area 924 may be partitioned by a centerline passing through a center point of a surface defined by the overlapped surface area 924, with the centerline forming two dissimilar sections in a manner previously described. The change in work energy ΔW may be proportional to the change in overlapped surface area such that $$\Delta W \propto \left( L^2 - \frac{L^2}{4} \right) = \frac{3L^2}{4}$$

with the change in work energy ΔW representing the work energy required to move the second magnet 930 laterally a distance D (or L/2) with respect to the first magnet 920. This, again, ignores frictional forces. Furthermore, the force F required to move, or laterally displace, the second magnet 930 with respect to the first magnet 920 by a distance D may be expressed as $$F \propto \frac{\Delta W}{D} = \frac{3L^2}{4} \bigg/ \frac{L}{2} = \frac{3L}{2}.$$

Accordingly, the force F may be proportional to the 4 L/3. This suggests that the first magnet 920 and the second magnet 930, while each having the same surface area, $L^2$ (first surface 922), as that of the first magnet 320 and the second magnet 330, respectively (shown in FIG. 5), may nonetheless require 50% additional force (3 L/2 compared to L) to move the second magnet 930 laterally with respect to the first magnet 920 by the same distance D, as compared to the first magnet 320 and the second magnet 330 (shown in FIG. 5), assuming the same magnetic materials or magnetic elements are used for the aforementioned magnets. Thus, the magnetic material of the first magnet 920 and the second magnet 930 shown in FIGS. 13 and 14 may be the same as that of the first magnet 320 and the second magnet 330 shown in FIGS. 4 and 5, while still achieving the 50% additional force requirement (to move the second magnet 930 relative to the first magnet 920 by a distance D).

The described embodiments show relationship between magnets in terms of a change in overlapped area, or overlapped surface area. Conversely, however, the relationship may also be described in terms of a change in exposed area, or exposed surface area. In other words, the exposed surface area may include an inverse relationship as compared to the overlapped surface area. For example, FIGS. 8 and 9 show the overlapped surface area of the first surface 622 decreasing as the second magnet 630 is moved laterally with respect to the first magnet 620. FIGS. 8 and 9 further show an exposed surface area of the first surface 622 increasing from zero (or no) exposed surface area, in FIG. 8, to an exposed surface area 634 (total surface area of the first surface 622 minus the overlapped surface area 624), in FIG. 9. Accordingly, the required force to move a magnet relative to another magnet (of similar size and shape, for example) may be approximately determined based upon not only a decreasing overlapped surface area but also an increasing exposed (non-overlapped) surface area. In other words, the required force to move a magnet laterally may be proportional to the exposed surface area (or a change in the exposed surface area).

Figure 15:
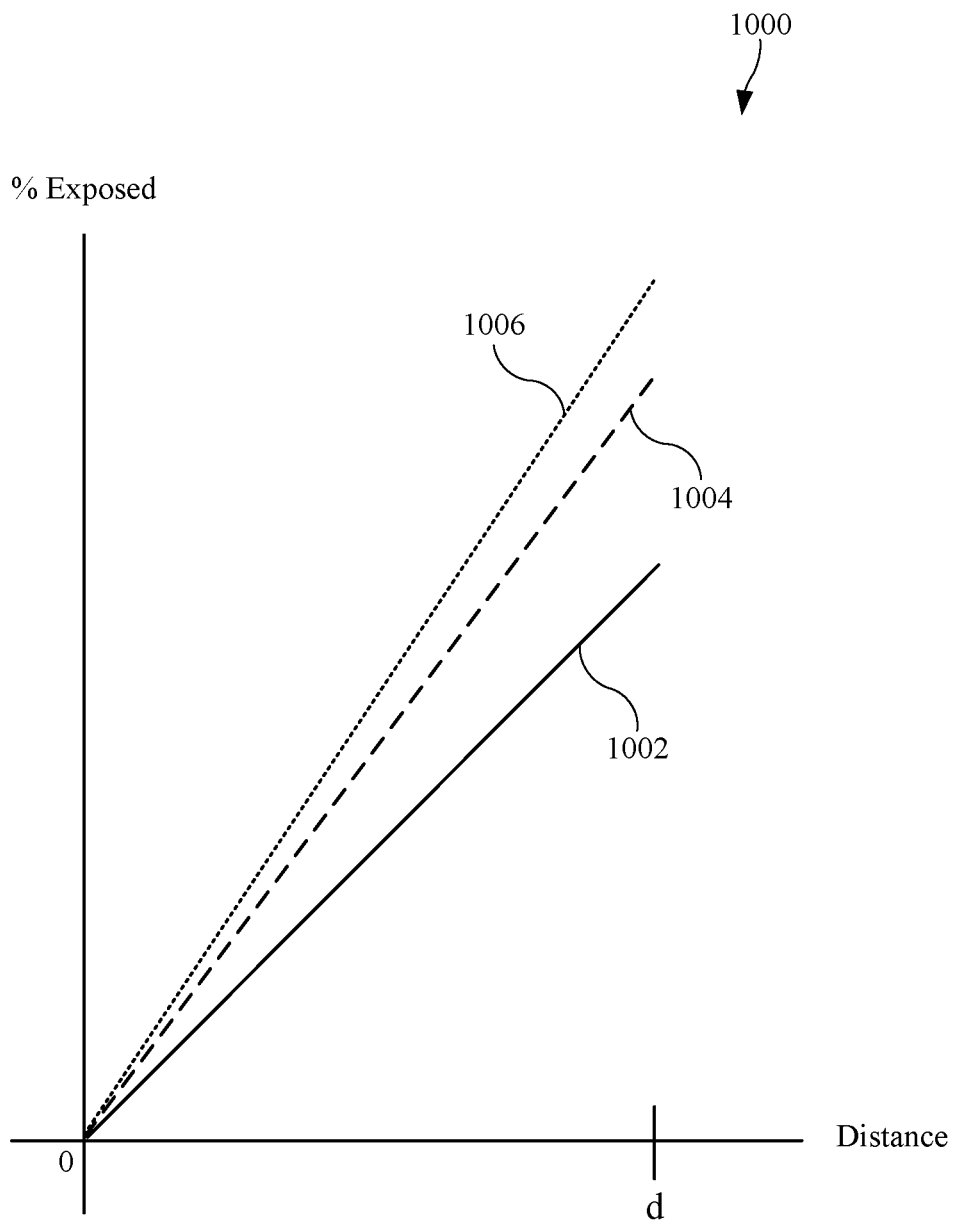
FIG. 15 illustrates a graph plotting exposed surface areas of a magnet relative to another magnet as a function of distance, in accordance with the described embodiments.

To further illustrate, FIG. 15 illustrates a graph 1000 plotting exposed surface areas of a magnet relative to another magnet as a function of distance, in accordance with the described embodiments. The distance "d" may refer to a distance traveled by a first magnet relative to a second magnet, with the first and second magnets magnetically coupled with one another. A first plot 1002 represents a percent exposure of a rectangular magnet (including a square magnet) moving laterally with respect to another magnet having a similar size and shape. Accordingly, the first plot 1002 may represent the first magnet 320 and the second magnet 330, shown in FIGS. 4 and 5. The distance "d" may refer to a distance L/2, where L is a side dimension of the first magnet 320 (shown in FIGS. 4 and 5).

FIG. 15 further shows a second plot 1004 that represents a percent exposure of a trapezoidal magnet moving laterally with respect to another magnet having a similar size and shape. Accordingly, the second plot 1004 may represent the first magnet 620 and the second magnet 630, shown in FIGS. 8 and 9. Also, the distance "d" may refer to a distance L/2, where L is a side dimension of the first magnet 620 (shown in FIGS. 8 and 9).

A comparison between the second plot 1004 and the first plot 1002 shows that the percent exposed area may increase for trapezoidal magnets as compared to rectangular magnets, for the same distance "d" moved by one of the magnets, even when magnets represented by the first plot 1002 and the second plot 1004 include similar, or substantially similar, surface areas. As previously described, the reduced overlapped surface area of the magnets in FIGS. 8 and 9, as compared to the magnets shown in FIGS. 4 and 5, may correlate to a relatively higher lateral force required to move one magnet relative to another. Also, as previously described, the change in overlapped surface area may include an inverse relationship (including an inverse proportional relationship) as that of the change in exposed surface area. Accordingly, FIG. 15 also suggests the relatively increased surface area of the magnets having an asymmetric surface area profile (such as the trapezoidal magnets of FIGS. 8 and 9), as compared to the magnets shown in FIGS. 4 and 5, may correlate to a relatively higher lateral force required to move one trapezoidal magnet relative to another trapezoidal magnet, as compared to moving rectangular magnets. In other words, the retaining force, or retaining force profile, of a trapezoidal pair of magnets may be greater than that of a rectangular pair of magnets.

FIG. 15 further shows a third plot 1006 that represents a percent exposure of a triangular magnet moving laterally with respect to another magnet having a similar size and shape. Accordingly, the third plot 1006 may represent the first magnet 920 and the second magnet 930, shown in FIGS. 13 and 14. Also, the distance "d" may refer to a distance L/2, where L is a side dimension of the first magnet 920 (shown in FIGS. 13 and 14). A comparison between the third plot 1006 and the first plot 1002 shows that the percent exposed area may increase for triangular magnets as compared to rectangular magnets, for the same distance "d" moved by one of the magnets, even when magnets represented by the first plot 1002 and the third plot 1006 include similar, or substantially similar, surface areas. As previously described, the relatively reduced overlapped surface area of the magnets in FIGS. 13 and 14, as compared to the magnets shown in FIGS. 4 and 5, may correlate to a relatively higher lateral force required to move one magnet relative to another. FIG. 15 also suggests the relatively increased exposed surface area of the magnets having an asymmetric surface area profile (such as the triangular magnets of FIGS. 13 and 14), as compared to the magnets shown in FIGS. 4 and 5, may correlate to a relatively higher lateral force required to move one triangular magnet relative to another triangular magnet, as compared to moving rectangular magnets. In other words, the retaining force, or retaining force profile, of a triangular pair of magnets may be greater than that of a rectangular pair of magnets.

Thus, FIG. 15 also suggests that a retaining force profile formed by a magnetic circuit, or magnetic coupling, between magnets may be enhanced based upon the shape of the magnets. Accordingly, electronic devices and accessory devices, when magnetically coupled to one another, having magnets other than rectangular magnets may be more resistant to becoming offset with one another, as the magnets (such as trapezoidal or triangular magnets) form magnetic circuits that enhance a resistance force, or retaining force, as compared to rectangular magnets.

There are several advantages to using magnets that require a greater amount of lateral force to separate the magnets. For example, the use of mechanical features, including snaps, clips, "male" and "female" parts, may not be required as the magnets having the asymmetric area surface area profile (such as the trapezoid and triangular surfaces) may provide greater resistance to lateral forces. Also, as previously discussed, the use of larger magnets may not be required, which saves space in the electronic device and/or the accessory device. Also, smaller magnets may reduce costs. Also, while the described embodiments of electronic and accessory devices show magnets generally of the same size and shape, the size and shape may vary. For example, the electronic device may include a trapezoidal magnet and a triangular magnet, and the accessory device may also include a trapezoidal magnet and a triangular magnet in corresponding locations to magnetically couple with the trapezoidal magnet and the triangular magnet, respectively, in the electronic device.

Additional devices may include the magnetic pairs previously described. For example, in some embodiments, the electronic device is a laptop computing device and the accessory device is a protective cover designed to overlay a display assembly of the laptop computer device. In some embodiments, the electronic device is includes a magnetic receptacle designed to magnetically couple with a magnetic connector.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A magnetic attachment assembly, comprising:
   a first magnetic element; and
   a second magnetic element, wherein in an aligned configuration, the first magnetic element and second magnetic element form a magnetic circuit based upon a magnetic surface having an asymmetric shape that provides an asymmetric retaining force in accordance with a relative direction of movement between the first magnetic element and second magnetic element corresponding to an offset configuration that is different from the aligned configuration.

2. The magnetic attachment assembly of claim 1, wherein the magnetic circuit provides a counterforce to position the first magnetic element and the second magnetic element from the offset configuration to the aligned configuration.

3. The magnetic attachment assembly of claim 1, wherein the first magnetic element comprises a surface having an asymmetric surface area profile, the asymmetric surface area profile comprising:
   a first section; and
   a second section separated from the first section by a centerline passing through a center point of the surface, wherein the first section is different the second section.

4. The magnetic attachment assembly of claim 3, wherein when one of the first magnetic element and the second magnetic element moves in a direction parallel to the centerline, the magnetic circuit provides a retaining force profile in accordance with the asymmetric surface area profile.

5. The magnetic attachment assembly of claim 3, wherein the asymmetric surface area profile comprises a trapezoid shape.

6. The magnetic attachment assembly of claim 1, wherein the first magnetic element comprises a surface having a triangular shape, and wherein the second magnetic element comprises a surface having a size and shape in accordance with the triangular shape.

7. An electronic device configured to releasably couple with an accessory device having an accessory magnet, the electronic device comprising:
   an enclosure; and
   a magnet carried by the enclosure and configured to magnetically couple with the accessory magnet to form a magnetic circuit, wherein in response to a force that offsets the accessory magnet with respect to the magnet, the magnetic circuit provides an asymmetric counterforce that causes the accessory magnet to align with the magnet.

8. The electronic device of claim 7, wherein the magnet includes a size and shape similar to the accessory magnet.

9. The electronic device of claim 8, wherein the magnet comprises a surface comprising an asymmetric area distribution.

10. The electronic device of claim 9, wherein the surface comprises a trapezoidal shape.

11. The electronic device of claim 9, wherein the surface comprises:
   a first section; and
   a second section separated from the first section by a centerline passing through a center point of the surface, wherein the first section is different from the second section.

12. The electronic device of claim 7, wherein the enclosure comprises a sidewall that allows an attachment feature of the accessory device to engage the sidewall.

13. The electronic device of claim 12, wherein the counterforce is perpendicular to the force.

14. The electronic device of claim 7, wherein the force aligns the accessory magnet with the magnet such that a surface of the magnet is completely aligned with a surface of the accessory magnet.

15. An accessory device configured to magnetically couple with an electronic device having a device magnet, the accessory device comprising:
   a body configured to cover the electronic device;
   an attachment feature configured to engage the electronic device;
   a hinge coupled with the body and the attachment feature, the hinge allowing the body to fold over the electronic device; and
   a magnet comprising an asymmetric surface area profile and configured to align and magnetically couple with the device magnet to form a magnetic circuit based on the asymmetric surface area profile, wherein when the device magnet is offset with respect to the magnet, the magnetic circuit provides an asymmetric counterforce that causes the device magnet to align with the magnet.

16. The accessory device of claim 15, wherein the magnet includes a size and shape similar to the device magnet.

17. The accessory device of claim 16, wherein the magnet comprises a surface comprising an asymmetric area distribution.

18. The accessory device of claim 17, wherein the surface comprises a triangular shape.

19. The accessory device of claim 17, wherein the surface comprises:
   a first section; and
   a second section separated from the first section by a centerline passing through a center point of the surface, wherein the first section is different from the second section.

20. The accessory device of claim 15, wherein the asymmetric counterforce is perpendicular to a force provided by the magnetic circuit.

* * * * *